US010362766B2

(12) United States Patent
Bellon et al.

(10) Patent No.: US 10,362,766 B2
(45) Date of Patent: Jul. 30, 2019

(54) ANIMAL TRAINING COLLAR

(71) Applicants: Bart Bellon, Hoboken (BE); Michaël Bellon, Hoboken (BE)

(72) Inventors: Bart Bellon, Hoboken (BE); Michaël Bellon, Hoboken (BE)

(*) Notice: Subject to any disclaimer, the term of this patent is extended or adjusted under 35 U.S.C. 154(b) by 39 days.

(21) Appl. No.: 15/564,253

(22) PCT Filed: Jun. 23, 2016

(86) PCT No.: PCT/EP2016/064540
§ 371 (c)(1),
(2) Date: Oct. 4, 2017

(87) PCT Pub. No.: WO2017/001279
PCT Pub. Date: Jan. 5, 2017

(65) Prior Publication Data
US 2018/0125035 A1   May 10, 2018

(30) Foreign Application Priority Data

Jun. 30, 2015 (EP) .................................... 15174651

(51) Int. Cl.
*A01K 27/00* (2006.01)
*A01K 15/02* (2006.01)
*G01S 19/14* (2010.01)

(52) U.S. Cl.
CPC .......... *A01K 27/001* (2013.01); *A01K 15/021* (2013.01); *A01K 27/009* (2013.01); *G01S 19/14* (2013.01)

(58) Field of Classification Search
USPC ................. 340/573.3, 573.1, 573.4, 539.15; 119/712, 721, 859, 908, 718, 795, 858
See application file for complete search history.

(56) References Cited

U.S. PATENT DOCUMENTS

| 4,745,882 A * | 5/1988 | Yarnall, Sr. ............. A01K 3/00 119/721 |
| 6,885,305 B2 * | 4/2005 | Davis ................... A01K 15/021 340/539.1 |
| 6,923,146 B2 * | 8/2005 | Kobitz ................. A01K 15/023 119/721 |
| 6,970,090 B1 * | 11/2005 | Sciarra ................ A01K 15/023 119/795 |
| 7,335,168 B2 * | 2/2008 | Rugg .................... G16H 50/20 600/595 |

(Continued)

FOREIGN PATENT DOCUMENTS

DE    20 2004 011 942 U1    12/2004

*Primary Examiner* — Yvonne R Abbott-Lewis

(57) ABSTRACT

A modular device for wireless communication between a transmitter and a receiver, the latter being mounted on a fastener to be worn by an animal/a human being or to be in contact therewith, comprising a string of individual separate elements or modules (210, 310), each containing at least either the PCB (213, 313), the battery (214, 314) or one or more contact points (220, 320) of same polarity respectively, said separate individual elements (210, 310) being attached to one another thanks to at least two substantially parallel flexible tubes (31, 32; 331, 332) containing said wires, so that the specific location of the modules (220, 320) containing the contact points and the order or sequence thereof in the string define an extension length for the contact points.

14 Claims, 5 Drawing Sheets

(56) References Cited

U.S. PATENT DOCUMENTS

| | | | |
|---|---|---|---|
| 7,634,975 B2 * | 12/2009 | Kates | A01K 15/021 |
| | | | 119/712 |
| 7,667,607 B2 * | 2/2010 | Gerig | A01K 15/021 |
| | | | 340/573.1 |
| 8,783,212 B2 | 7/2014 | Bellon et al. | |
| 8,851,019 B2 * | 10/2014 | Jesurum | A01K 15/023 |
| | | | 119/721 |
| 2007/0204803 A1 | 9/2007 | Ramsay | |
| 2012/0252486 A1 | 10/2012 | Lopez et al. | |
| 2014/0261235 A1 | 9/2014 | Rich et al. | |

* cited by examiner

ANIMAL TRAINING COLLAR

FIELD OF THE INVENTION

The present invention is related to the general technical field of electronic devices for wirelessly controlling and/or tracking moving objects at a distance. Specifically, the invention relates to design of such an electronic device with a receiver integrated within a wearable item. Within the device, a receiver is usually communicatively coupled, preferably bi-directionally, to a transmitter being another separate device, or another part of the same electronic device that sends control signals to the receiver to generate customizable outputs. For example, the transmitter can be a handheld transmitter or a wired or wireless boundary transmitter, which acts as an invisible fence. The receiver wirelessly reacts to the signals sent as well by the handheld transmitter or the electronic fence. More generally transmitter and receiver can be both transceivers (transmitters/receivers) for bidirectional communication.

The scope of this invention covers animal training and anti-bark collars with integrated electronics, especially dog collars. Collars with GPS/tracking electronics and electronic fence collars may also be considered as falling under the scope of the invention.

BACKGROUND OF THE INVENTION AND PRIOR ART

Conventional electronic collar-mounted emitters/receivers, automatic electronic stimulators, etc., provide remote/leash-free access to animals using communication via sound, vibration, and/or electronic/high voltage stimulation at varying levels. Examples of these devices include remote animal-training collars, anti-bark collars, containment collars, hunting collars for dogs that provide GPS/radio transmission, etc.

Overall such animal training devices incorporate modern electronics with circuitry and transformers which are generally useful to adjust the required voltage, for example when stimulating the animal by bipolar contact points affixed directly onto the skin of the animal.

The collar-mounted receivers/transmitters or electronically controlled collars presently available are often encased in a hard box-shaped or flexible plastic housing with some sort of loop or tab of plastic or metal to thread the collar through for attachment purposes.

The collar on which the electronics are mounted is normally used on the neck of an animal, but the scope of the invention is not limited to use on the neck only. Often the receivers are threaded through a strap which goes around the waist, chest, or other part of the animal.

The components in a conventional receiver such as battery, printed circuit board (PCB) or transformer can be stacked vertically to reduce surface area on the animal's neck. Such a bulky device with two fixed contact points placed side by side involves certain drawbacks.

Firstly, gravity constantly pulls the box to its lowest position. This affects the effectiveness of the contact, because it either becomes loose, or pushes on the larynx of the dog, leading to discomfort. Moreover, as the housing has a propensity to always fall to the same spot on the animal's body, there is often a rubbing that leads to necrosis, i.e. a blistering of the skin from constant friction at the same spot.

Secondly, due to the horizontal fixed nature of the contacts, large bulky housing containing animal collar receivers are difficult to use on small dogs. The large inflexible box does not wrap well around small necks, and this makes proper contact difficult.

Additionally, there is minimal or no ability to customize output of the receiver. Stimulus levels are often factory set on present day electronic animal collar-mounted receivers. For example, if level two is too low and level three is too strong, there is not much scope to adjust the level to something in between that can be customized for a particular animal.

Thirdly, bulky receiver designs are aesthetically compromising, and often lead to unwanted interrogation/curiosity, which may interfere with the psychological dynamics between the animal and the animal handler/owner, and/or between the handler/owner and other human beings, e.g. spectators.

Having in view the need for a better design of receiver to address the known problems discussed above, the Applicant already obtained a patent granted (U.S. Pat. No. 8,783,212 B2) for an electronic collar that can be used on an animal to provide remote communications and/or automatic electronic reaction in response to a stimulus, such as vibration, sound, high voltage (HV), etc. The related design provides structural and functional set up for collar-mounted electronics that are easier to customize, avoid a common problematic medical issue (necrosis), are lighter in weight, and more discreet in structure, resulting in optical, functional and psychological advantages over solutions previously available in the market.

This invention attains performance improvements by, among other things, diminishing the bulk of the electronics, providing more physical comfort to the animal by conforming to the natural shape of the animal's body and/or by flexibly adjusting contact points. At the same time, the design addresses aesthetic and psychological issues involved in animal handling.

This design also opens up the possibility of using multiple contact points on each side of the electronics to deliver distributed signal rather than sending the entire signal through just two (one positive and one negative) contact points. The multiple contact points' advantage is harnessed in the design of extendors, as described in greater detail below.

The above patent addresses the problem of providing a flexible structure for the collar-mounted receiver that is more comfortable for the animal that is wearing it. For example, a rubbery flexible molding used for products, commercially known as "Chameleon®", marketed by Bart Bellon's company "BCBB" via Dogsport.be, a company based in Belgium, is used in the embodiments of the patent to hold the electronics in a comfortable location on the animal's body. The material used for the molding may be a flexible polymer such as a polyamide. The battery and the electronics of the receiver (on a printed circuit board or integrated circuit chip) are placed next to each other instead of being stacked vertically, so the external shape and the look of the collar remains thin and sleek. Yet another aspect of the patent is to achieve flexibility of positioning of the contact points that deliver electronic signals to the animal. This enhances physical comfort and can be utilized more effectively for the animal's behavioral monitoring/training purposes. The patent makes it possible to easily move or change the number of contact points to customize response and to eliminate habitual rubbing leading to necrosis. Unlike other collars available in the market, contacts can be affixed vertically or in any other spatial arrangements, and the number of contacts can be varied too. Specially designed "extendors" may be used to beneficially use the effects of gravity, where the electronics are pulled to the lowest point and the contacts consequently are pulled closer to the sides of the neck, when an animal wears the collar-mounted receiver of the invention.

Specially designed "extendors" may be used to beneficially use the effects of gravity, where the electronics are pulled to the lowest point and the contacts consequently are pulled closer to the sides of the neck, when an animal wears the collar-mounted receiver of the present invention. The extendors may be sold separately (i.e. apart from the Chameleon®) and can be worn as a "dummy" Chameleon® collar or they may be used in conjunction with a variety of brands of electronic collars to utilize the benefits of using the effects of gravity where the electronics are pulled to the lowest point and the contacts consequently are pulled closer to the sides of the neck. Additionally, the feature of moving contact points (or changing their positioning) to customize response and/or to eliminate habitual rubbing leading to necrosis can be added to any brand name receiver due to the purchase of extendors which will be sold separately as an accessory and which fit over the manufacturer contact points and thus providing all the functionalities of the extendors that come as a factory setting on the Chameleon® collar receiver.

Moreover, the sleek, inconspicuous design of this invention is suitable for being integrated with a flat collar, so there is no unseemly "box" visible to attract unwanted attention. Overall the collar (and the receiver integument) is optimized for comfort, durability, functionality and aesthetics.

Moreover, document DE 20 2004 011 942 U1 discloses a collar for animals, especially dogs, with contact surfaces and a control and switching means, wherein at least one sensor is arranged for moisture detection. An evaluation unit is provided. The evaluation unit as well as the control and switching means are directly arranged to the collar.

AIMS OF THE INVENTION

The present invention aims to provide a solution for discarding the drawbacks of prior art.

In particular the invention is intended to provide further improvements to the disclosure of document U.S. Pat. No. 8,783,212.

More particularly the invention is intended to provide flexible and comfortable electronic dog collars which are suitable of any size of dog.

The invention also aims at protecting animals which are confined in vehicles or buildings potentially subjected to extreme temperature conditions (hot or freezing temperatures), severely endangering the animals.

SUMMARY OF THE INVENTION

The present invention relates to a modular device for wireless communication between a transmitter and a receiver, the latter being mounted on a fastener to be worn by an animal/a human being or to be in contact therewith, the device comprising an electronic receiver having an electronic circuit and a plurality of electrical contact points extending at a distance from the electronic circuit, the contact points being used to deliver an electrical output in a number of distinct levels into the animal's or human being's body in response to a command signal communicated wirelessly by the transmitter, the electronic receiver comprising a PCB for receiving and handling the command signal, a battery for feeding the receiver, one or more contact points with the animal/human being's body connected by insulated wires to the PCB in such a manner to have a positive polarity, respectively a negative polarity, wherein the modular device is structurally made of a string of individual and distinct separate elements or modules, containing each a functional part selected from the group consisting of a PCB, a battery and a part containing one or more contact points of the same polarity respectively, at least part of said individual and distinct separate elements being attached to one another only thanks to at least two substantially parallel flexible tubes of a given length containing said insulated wires, so that the specific location of the modules containing the contact points and the order or sequence thereof in the string define an extension length for the contact points.

According to preferred embodiments, the modular device additionally comprises at least one of the following features or a suitable combination thereof:

- the individual distinct and separate elements (so-called "islands"), attached so as to make a string, substantially have the shape of a box, the tubes of a given length being connected to the side edges of the latter;
- the device optionally comprises means for attaching some of the modules directly together with proper mechanical and electrical contact, without the intermediate flexible tubes between two modules, so that said modules can be flexibly added, removed or interchanged in the device;
- the individual distinct and separate element (so-called "islands") are made of synthetic material molded with said tubes in a single string;
- the PCB and the battery are each encapsulated in a single-molded element while the individual separate elements containing contact points have each one or more pins protruding out of the molded material;
- the flexible tubes of a given length are made of synthetic twistable and stretchable material, so that the whole string can be stretched and/or twisted in use;
- the receiver substantially conforms to a contour of a body part of an animal or human being, ensuring improved contact between the extended contact points with the animal's or human being's body;
- the modular collar further includes an electronic transmitter possessed and operated by an animal's handler that generates the command signal;
- the electrical output into the animal's body is configured to be varied continually to customize to a requirement;
- the string of individual and distinct separate elements being attached using at least two substantially parallel flexible tubes of a given length is incorporated in a fastener suitable to attach the receiver to the animal or human being;
- the individual and distinct separate elements (so-called "islands") are connected through the substantially parallel flexible tubes of a given length in series, in parallel or in tree form;
- a remotely controllable lighting system is incorporated within the string of individual and distinct separate elements being attached using at least two substantially parallel flexible tubes of a given length, individual lighting components being incorporated in said individual separate elements;
- a device having a function of measuring local temperature or of detecting noxious gases is incorporated within at least one element of the string of individual and distinct separate elements being attached to one another thanks to at least two substantially parallel flexible tubes of a given length the modular device is part of a system selected from the group of an animal training or stimulation collar, an anti-barking collar, a GPS-containing tracking collar, an electronic fence, a baby monitoring device and a stimulation system for horses made of man-worn leggings comprising spikes for providing electric stimulus.

DETAILED DESCRIPTION OF THE INVENTION

The present invention relates to a number of new features improving the disclosure of patent No. U.S. Pat. No. 8,783,212 B2.

In a first aspect of the disclosure, the electronic collar-mounted receiver is composed in a flexible manner of individual elements which will be called hereinafter "islands", and which can be for example square-shaped molded elements comprising each a functionality. These elements are connected to each other by two parallel flexible tubes, preferably made of synthetic material. The possible functionalities of the electronic collar included in these islands are already described in the aforementioned patent: battery, printed circuit board (PCB), one or more plus poles/contact points, one or more minus poles/contact points, the actual order of all these functional items being arranged in a very flexible and interchangeable manner.

In the aforementioned US patent, this interchangeability is partially played by the so-called "extendors" which permit to affix the contacts points in predetermined locations with substantial advantages (increasing comfort of the animal and avoiding necrosis, adaptation to animals of different sizes, etc.). As already mentioned in the US patent, it is very advantageous that the contact points are located in a very versatile fashion.

In the device of the present invention, all the electric connections are ensured thanks to suitably-connected electrical wires provided inside the flexible tubes interconnecting the functional islands. These tubes can easily be twisted and even stretched due to their flexibility and elasticity, of course without providing breaking risk of the internal wires. This twisting/stretching property renders the collar-mounted receiver particularly resistant to mechanical shocks and suitable to be worn by little dogs. Of course the collar of the invention is finished by providing it with such attaching means and/or casing (cover) usually known in the art.

In a second aspect of the disclosure, the collar can be provided with a remote-controllable lighting system or on the contrary, upon remotely switching off of this function, has the property to be invisible or indistinguishable from ordinary leather collar such as ordinary Chameleon® collar (the receiver can be provided or not with a cover in leather).

In a third aspect of the disclosure, the collar is advantageously provided with a device having a function of measuring local temperature or of detecting noxious gases.

The device of the present application is not limited to collars for animal training or anti-barking but is also intended for use for example in tracking collars (GPS-collars), electronic fences, baby monitoring device or for man-worn leggings provided with spikes allowing electric stimulation of horses.

Figure 1:
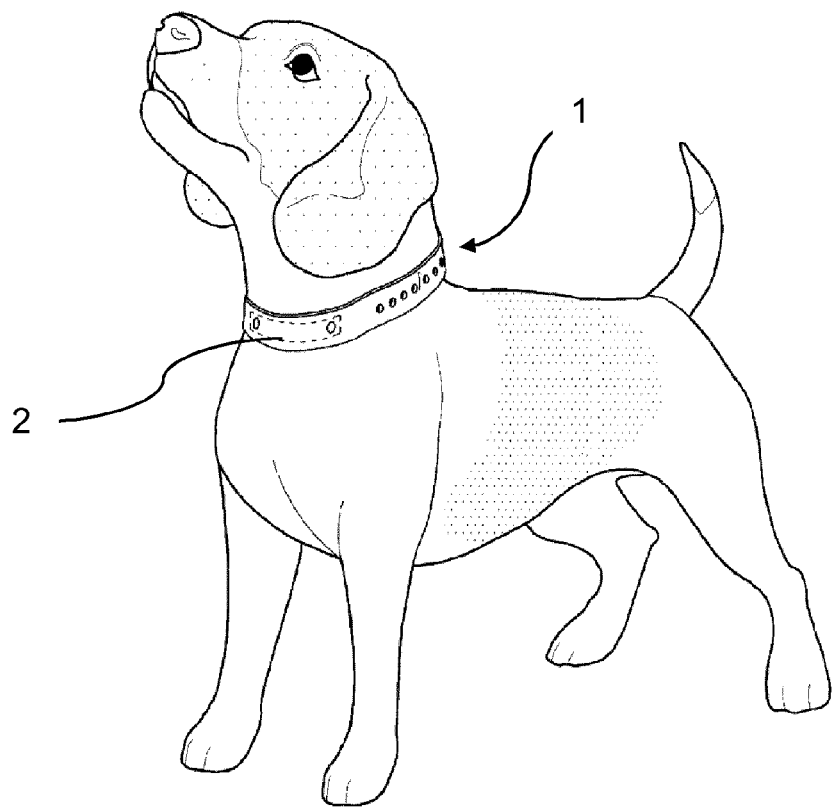
FIG. 1 shows an embodiment of a collar-mounted receiver device, according to the design disclosed in U.S. Pat. No. 8,783,212 B2.

FIG. 1 shows an example of dog collar 1 improvement about the common "boxy" design, as disclosed in patent No. U.S. Pat. No. 8,783,212 B2, wherein the receiver 2 (shown with dotted line) is not visible externally. The receiver is affixed to the usual prior art type of collar 1 (made of leather for example).

Figure 2:
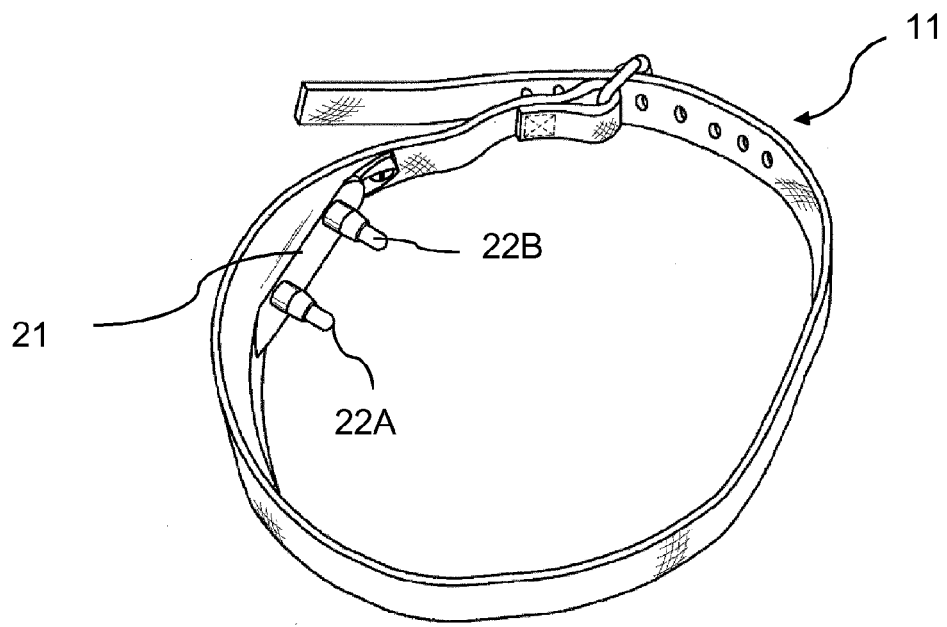
FIG. 2 shows a more detailed view example of the collar-mounted receiver device as shown in FIG. 1.

FIG. 2 is a view of an embodiment 11 showing components of the receiver 2 of FIG. 1. Receiver 2 comprises a body 21 (preferably made of flexible injection-molded or otherwise manufactured semi-malleable material) that encases the internal electronic circuitry with two lateral contact points 22A and 22B extending therefrom.

Figure 3:
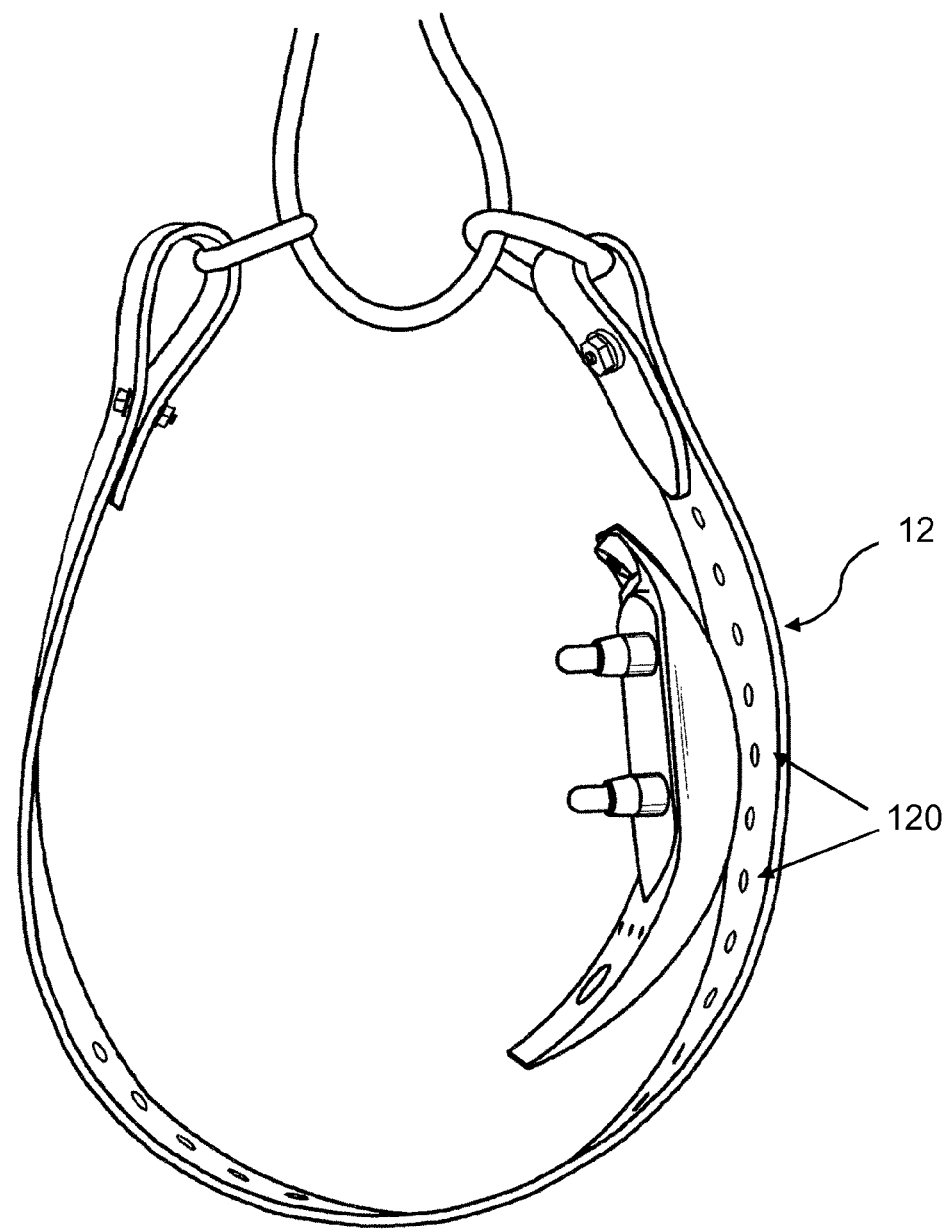
FIG. 3 shows the embodiment of a collar-mounted receiver as disclosed in U.S. Pat. No. 8,783,212 B2, flexibly affixed to a collar for the purpose of providing greater conformity and comfort to the animal that wears the collar.

FIG. 3 shows another embodiment 12 of prior art where the receiver can be moved to any number of locations on a collar (affixation with two screws in distinct openings 120 of the collar). This particular receiver/collar affixation can be placed at any number of places on an animal's body with the receiver secured at a chosen location. This ensures a conformal effective and precise fit to the animal's body. The curvature and elasticity of the injection-molded body can be controlled to ensure better fit. Flexible electronics inside the injection molding may be further useful for this purpose. The receiver/collar depicted in FIG. 3 is, as mentioned above, trademarked under the name Chameleon®.

Figure 4:
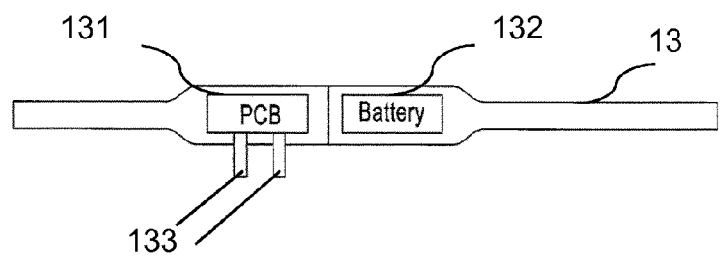
FIG. 4 shows placement of components within the above-mentioned electronic receiver device, with fixed contact points.

FIG. 4 shows an alternative design of prior art, where the PCB 131 and battery 132 are stacked horizontally. The contact points 133 may still be horizontal, but due to the overall spatial arrangement and diminished size of the electronics, the effectiveness of the contact is better than in former bulky vertically stacked configurations (not shown). Here the PCB and battery are integrated side by side into a rubberized plastic injection-molded body that accommodates a longer length because the injection-molded portion is allowed to slightly bend (for example, around the neck of a dog). The injection molded body is virtually unbreakable (compared to brittle plastic casing) and the electronics are protected accordingly.

Figure 5A:
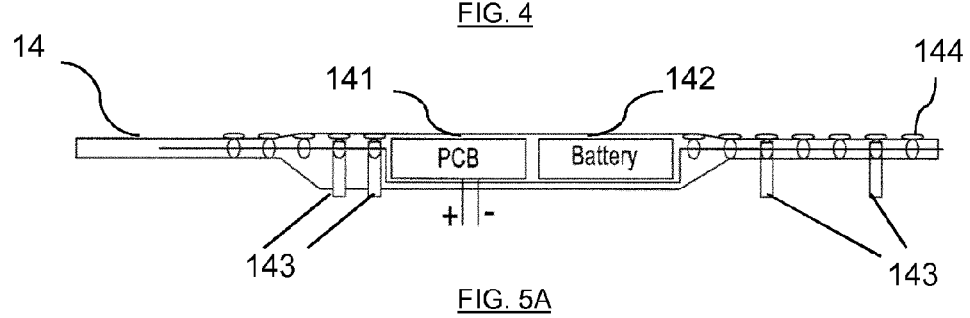
FIG. 5A shows a configuration for the placement of an extendor enabling movement of the position of the contact points with respect to the collar.
Figure 5B:
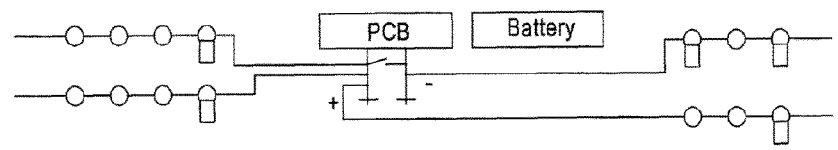
FIGS. 5B-5C show examples of "dual-extendor" configurations, according to other embodiments.
Figure 5C:
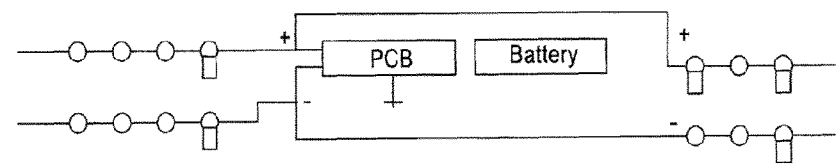

FIGS. 5A-5B show alternative design comprising 'extendors' (about FIG. 4) to further improve the effectiveness of the contact points. FIG. 5A shows a 'single-extendor' configuration, while FIGS. 5B-5C show 'dual-extendor' configurations. One of the main advantages of the 'extendor' is to flexibly distribute the contact points (i.e. to accommodate multiple contact points delivering electric signal of the same polarity while being distributed at various spatial locations).

The difference between FIG. 4 (no extendor) and FIG. 5A (including extendor) is that the contact pins 143 in FIG. 5A can be adjusted to any of the predefined positions 144 around the PCB 141 and battery 142 by moving the extendor in parallel to the collar. The positive pole of the contact goes to one side of the PCB, and the negative pole may go to the other side. A special type of washer may be built into or on top of the collar to create the predefined positions for the contacts. The extendors are affixed movably to the collar to minimize slippage.

The configuration with extendors represented in FIGS. 5A to 5C remains however complicate and expensive to manufacture and provide still limited flexibility of use, especially in using the collar with very different sizes of animals.

Figure 6:
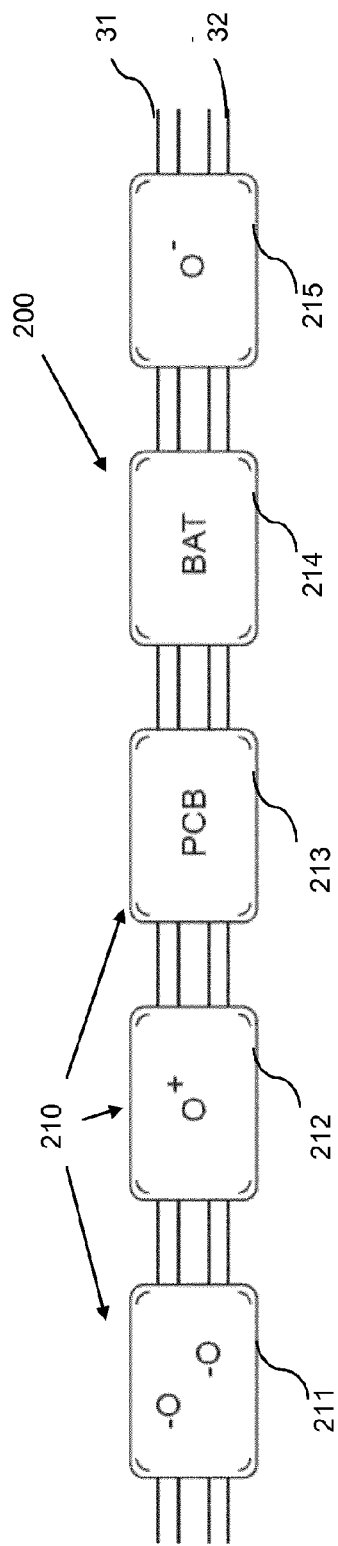
FIG. 6 shows an embodiment of a collar-mounted receiver as disclosed in the present invention.

FIG. 6 shows an example of embodiment for an electronic collar receiver 200 according to the present invention. As shown in FIG. 6, the collar 200 comprises a chaplet or string of molded "islands" entities or functional modules 210 (in this example five) bearing the following respective functionalities: two contact points not aligned with the direction of the device and corresponding to minus poles 211, a contact point corresponding to a plus pole 212, a PCB circuit 213, a battery 214 and finally a contact point corresponding to a minus pole 215. The molded islands are connected by parallel-mounted flexible tubes 31, 32, containing the electric wires which are suitably connecting the various electric parts of the device such as PCB, battery and the different contact points (modules) (not shown): different sets of contact points, battery, PCB, etc. The particular configuration depicted on FIG. 6 is only one of the multiple possibilities for conceiving a collar according to the present invention and is by no way restricting the scope of the present application. The system can be conceived to allow easy order or sequence interchange between the different entities.

In one embodiment the configuration is sealed by molding in factory, the number and order of the "islands" being possibly provided on demand or customized.

In another embodiment the structure or manufacture of the collar is such that the user can interchange himself the number or the order of the modules. Preferably a suitable mechanical system with appropriate electrical contacts may be provided so that at least part of the islands/modules can be attached together, without the intermediate flexible tubes between two islands. So the system shall be flexible so that the user can "add" or "subtract" one or more modules to and from the collar respectively. Such a system is very advantageous since it can for example allow inserting backup battery for more autonomy, changing the position of the contact points (or the length of the extendors) according to the size of the animal or favoring easy repair such as change of the battery.

As in the configuration of prior art depicted in FIG. 4, the injection-molded island chaplet or string may have general asymmetry where the contacts are placed in an asymmetric fashion and at a number of locations on the collar-mounted receiver, resulting in a fit that is more comfortable or electrically efficient for the animal's body shape. For example, due to the asymmetry, the contacts may fit naturally beside the larynx or other sensitive regions of the animal when placed around the neck rather than sitting and pressing on the larynx as in the case of traditional collars. In particular, different connection configurations of the elements such as connection in series, in parallel or in tree form may be particularly advantageous owing to their capacity to cover a greater surface or specific spots on the animal body.

Figure 7:
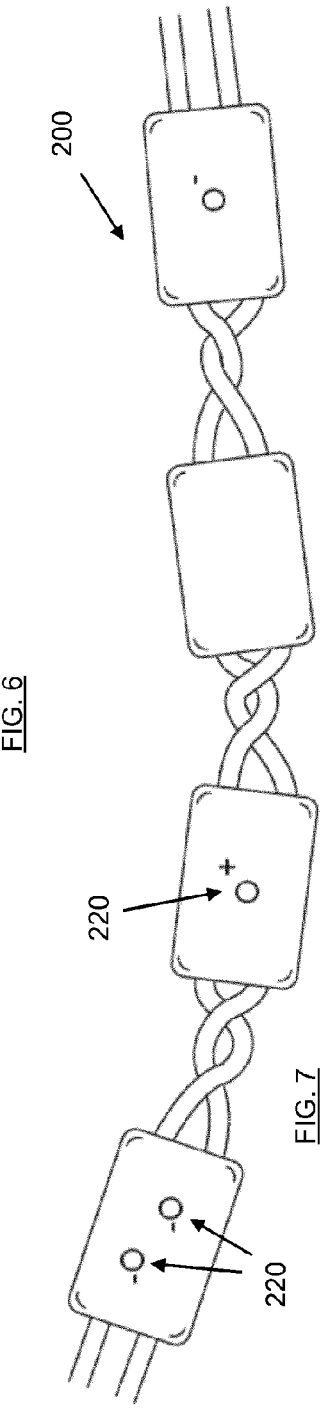
FIG. 7 shows the collar-mounted receiver device of FIG. 6 in a twisted configuration.
Figure 8:
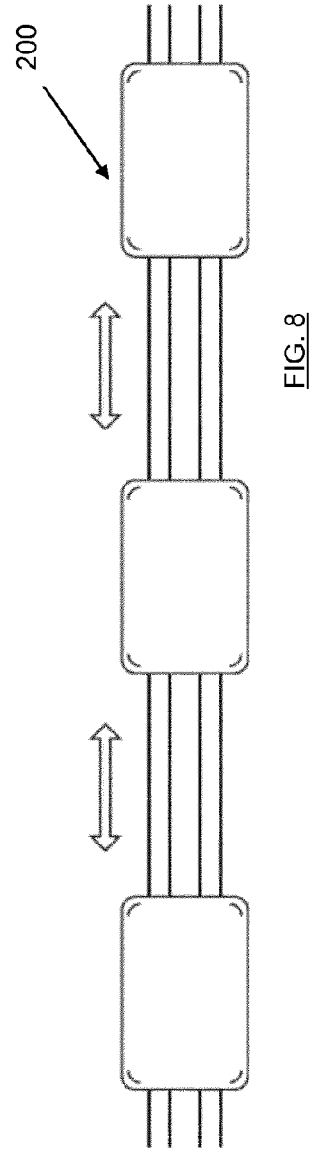
FIG. 8 shows the collar-mounted receiver device of FIG. 6 in a stretched configuration.

FIG. 7 shows the configuration of FIG. 6 wherein the connecting tubes 31, 32 have been twisted while FIG. 8 shows the configuration of FIG. 6 wherein the connecting tubes 31, 32 have been stretched. Both configurations of the collar are likely to occur in use and/or when the animal is in movement.

Figure 9:
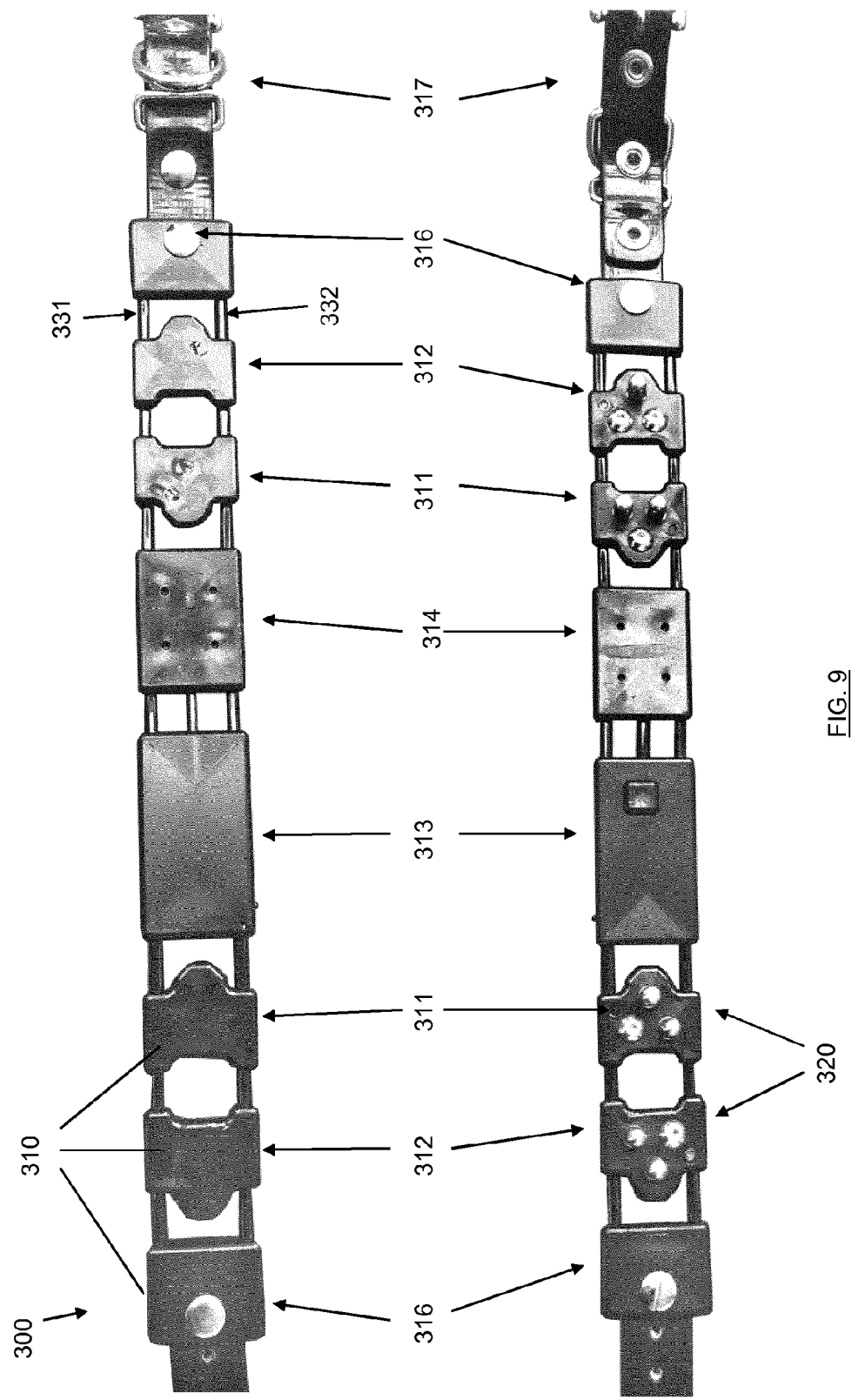
FIG. 9 shows the front side and the rear side of a realistic embodiment corresponding to a collar-mounted receiver of the present invention affixed to a type of standard collar available on the market.

FIG. 9 shows the front side and the rear side respectively of a prototype collar-mounted receiver 300 according to one embodiment of the present invention, affixed to a type of standard collar 317 available on the market. The string of modules 311, 312, 313, etc. constituting the receiver as such is affixed to the collar part (having standard attachment means, etc.) by a screw module 316 at each end thereof. Here the configuration is symmetric: the PCB 313 and the battery 314 are central, with at each side a module 311 with 3 negative contact points (for example) followed by a module 312 with 3 positive contact points.

Having the receiver under the shape of a string of physically separated elements ("islands" or "beads") and the possibility of twisting the string without breaking or damaging risk is very advantageous when attaching the collar to the neck of little dogs, as it is always possible to find the best position of the protruding contact pins to contact the skin of the dog to the benefit of both electric efficiency and animal comfort.

Additionally, owing to the particular configuration of separated modules attached to each other with flexible tubes, such a device shows inevitable space between the modules, allowing the fur of the animal to go through this space, providing thereby better and closer contact with the skin (on the neck for example).

Additionally the elastic properties of the tubes joining the different beads confer to the receiver outstanding tractability or particular resistance to shocks that can intervene in use.

Moreover the high versatility of the device allows for example to incorporate a backup battery, resulting in dramatic increase of the autonomy of the device or even with incorporation of small solar cells for recharging the battery.

In some embodiments, the collar of the invention may advantageously have elements (beads, modules) equipped with electronic control lighting means intended to make easier proper running instant check and/or with remotely controllable lighting means intended to provide more or less visibility of the animal to the handler and/or to other persons, including total invisibility or discretion (switch-off of the lighting).

In some embodiments, the collar of the invention may advantageously have elements (beads, modules) equipped with local temperature control system (e. g. with one or more sensors) or with noxious gas detection system. This functionality is particularly advantageous in case the dog is confined in environment with temperature conditions which could lead to a risk of severe dehydration and even death. It is common knowledge that animals, particularly police dogs, and even children, die every year due to being left too long in overheated vehicles.

The invention claimed is:

1. A modular device for wireless communication between a transmitter and a receiver, the latter being mounted on a fastener to be worn by an animal/a human being or to be in contact therewith, the device comprising an electronic receiver (200, 300) having an electronic circuit and a plurality of electrical contact points extending at a distance from the electronic circuit, the contact points being used to deliver an electrical output in a number of distinct levels into the animal's or human being's body in response to a command signal communicated wirelessly by the transmitter, the electronic receiver (200, 300) comprising a PCB (213, 313) for receiving and handling the command signal, a battery (214, 314) for feeding the receiver (200, 300), one or more contact points with the animal/human being's body (220, 320) connected by insulated wires to the PCB (213, 313) in such a manner to have a positive polarity, respectively a negative polarity, wherein the modular device is structurally made of a string of individual and distinct separate elements or modules (210, 310), containing each a functional part selected from the group consisting of a PCB (213, 313), a battery (214, 314) and a part containing one or more contact points (220, 320) of the same polarity respectively, at least part of said individual and distinct separate elements (210, 310) being attached to one another only thanks to at least two substantially parallel flexible tubes (31, 32; 331, 332) of a given length and containing said insulated wires, so that the specific location of the modules (210, 310) containing the contact points (220, 320) and the order or sequence thereof in the string define an extension length for the contact points.

2. The modular device according to claim 1, wherein the individual distinct and separate elements (210, 310), attached so as to make a string, substantially have the shape of a box, the tubes of a given length being connected to the side edges of the latter.

3. The modular device according to claim 1, wherein it contains means for attaching some of the modules directly together with proper mechanical and electrical contact, without the intermediate flexible tubes between two modules, so that said modules can be flexibly added, removed or interchanged in the device.

4. The modular device according to claim 3, wherein the PCB (213, 313) and the battery (214, 314) are each encapsulated in a single-molded element while the individual distinct and separate elements containing contact points (211, 212, 215; 311, 312) have each one or more pins (220, 320) protruding out of the molded material.

5. The modular device according to claim 1, wherein the individual distinct and separate element (210, 310) are made of synthetic material molded with said tubes (31, 32; 331, 332) in a single string.

6. The modular device according to claim 1, wherein the flexible tubes of a given length (31, 32; 331, 332) are made of synthetic twistable and stretchable material, so that the whole string can be stretched and/or twisted in use.

7. The modular device according to claim 1, wherein the receiver substantially conforms to a contour of a body part of an animal or of a human being, ensuring improved contact between the extended contact points with the animal's or human being's body.

8. The modular device of claim 1, further including an electronic transmitter possessed and operated by an animal's handler that generates the command signal.

9. The modular device of claim 1, wherein the electrical output into the animal's body is configured to be varied continually to customize to a requirement.

10. The modular device of claim 1, wherein the string of individual separate and distinct elements (210, 310) being attached using at least two substantially parallel flexible tubes (31, 32; 331, 332) of a given length is incorporated in a fastener suitable to attach the receiver to the animal or human being.

11. The modular device of claim 1, wherein the individual separate and distinct elements (210, 310) are connected through the substantially parallel flexible tubes of a given length (31, 32; 331, 332) in series, in parallel or in tree form.

12. The modular device of claim 1, wherein a remotely controllable lighting system is incorporated within the string of individual separate elements being attached using at least two substantially parallel flexible tubes of a given length, individual lighting components being incorporated in said individual separate and distinct elements.

13. The modular device of claim 1, wherein a device having a function of measuring local temperature or of detecting noxious gases is incorporated within at least one element of the string of individual separate and distinct elements being attached to one another tanks to at least two substantially parallel flexible tubes of a given length.

14. The modular device of claim 1, wherein it is part of a system selected from the group of an animal training or stimulation collar, an anti-barking collar, a GPS-containing tracking collar, an electronic fence, a baby monitoring device and a stimulation system for horses made of man-worn leggings comprising spikes for providing electric stimulus.

* * * * *